United States Patent
Gresset (10) Patent No.: US 10,805,943 B2
(45) Date of Patent: Oct. 13, 2020

(54) METHOD OF SCHEDULING IN CELLULAR SYSTEM AND COMPUTER PROGRAM PRODUCT AND SCHEDULING DEVICE THEREFOR

(71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/480,232

(22) PCT Filed: Jan. 19, 2018

(86) PCT No.: PCT/JP2018/002365
§ 371 (c)(1),
(2) Date: Jul. 23, 2019

(87) PCT Pub. No.: WO2018/173475
PCT Pub. Date: Sep. 27, 2018

(65) Prior Publication Data
US 2020/0008215 A1 Jan. 2, 2020

(30) Foreign Application Priority Data

Mar. 23, 2017 (EP) .................................... 17305333

(51) Int. Cl.
*H04W 72/12* (2009.01)
*H04B 7/0452* (2017.01)
*H04L 5/00* (2006.01)
*H04W 24/10* (2009.01)
*H04W 72/04* (2009.01)

(52) U.S. Cl.
CPC ...... *H04W 72/1231* (2013.01); *H04B 7/0452* (2013.01); *H04L 5/0035* (2013.01);
(Continued)

(58) Field of Classification Search
CPC .... H04B 7/0452; H04L 5/0035; H04W 24/10; H04W 72/046; H04W 72/121; H04W 72/1226; H04W 72/1231
See application file for complete search history.

(56) References Cited

U.S. PATENT DOCUMENTS

2010/0220601 A1* 9/2010 Vermani ............... H04L 1/0025
370/248
2011/0111760 A1* 5/2011 Bevan .................. H04B 7/0452
455/450

(Continued)

OTHER PUBLICATIONS

Castañeda et al., "An Overview on Resource Allocation Techniques for Multi-User MIMO Systems", IEEE Communications Surveys & Tutorials, vol. 19, No. 1, 2017, pp. 239-284.

(Continued)

*Primary Examiner* — Khaled M Kassim
(74) *Attorney, Agent, or Firm* — Birch, Stewart, Kolasch & Birch, LLP (57) ABSTRACT

A method of scheduling in a cellular system comprises:
calculating an approximated scheduling metric (ASM) for each combination of users, and associated spatial streams, the ASM being a function of user capacities without taking into account interference;
sorting the ASMs in descending order to obtain a classification of said combinations and calculating a local scheduling metric (LSM) for the first combination in said classification, the LSM being a function of real user capacities taking into account interference;
then, for each following combination (FC) in the classification, comparing the ASM of the FC to a preceding calculated local scheduling metric (PCLSM), and if the ASM of the FC is higher than the PCLSM, then the LSM of said FC is calculated and then replaces said PCLSM; and otherwise, defining the combination providing the
(Continued)

highest calculated LSM as the best combination of users and associated spatial streams.

20 Claims, 4 Drawing Sheets

(52) U.S. Cl.
CPC ......... *H04W 24/10* (2013.01); *H04W 72/046* (2013.01); *H04W 72/121* (2013.01)

(56) References Cited

U.S. PATENT DOCUMENTS

| | | | |
|---|---|---|---|
| 2012/0120824 A1* | 5/2012 | Meylan | H04W 48/10 370/252 |
| 2013/0231125 A1* | 9/2013 | Jeon | H04W 72/082 455/452.1 |
| 2017/0117996 A1* | 4/2017 | Lorca Hernando | H04L 5/0073 |
| 2018/0176743 A1* | 6/2018 | Elsherif | H04B 17/336 |
| 2018/0212653 A1* | 7/2018 | Miao | H04B 7/0452 |
| 2018/0270497 A1* | 9/2018 | Mukherjee | H04N 19/54 |
| 2019/0159223 A1* | 5/2019 | Park | H04W 72/1252 |
| 2020/0076535 A1* | 3/2020 | Xu | H04L 69/324 |

OTHER PUBLICATIONS

Castañeda et al., "An Overview on Resource Allocation Techniques for Multi-User Memo Systems", IEEE Communications Surveys & Tutorials, vol. 19, No. 1, 2017, pp. 239-284.

\* cited by examiner

METHOD OF SCHEDULING IN CELLULAR SYSTEM AND COMPUTER PROGRAM PRODUCT AND SCHEDULING DEVICE THEREFOR

TECHNICAL FIELD

The present invention relates to MU-MIMO (Multi User-Multiple Input Multiple Output) pairing and scheduling, and more specifically to the joint user pairing/scheduling and precoding in a cellular system of telecommunication network.

BACKGROUND ART

In cellular systems of telecommunication network, the multi-user scheduling allows for jointly achieving the quality of service (QoS) requirements of each user and optimizing the system spectral efficiency. Multi-user scheduling has become crucial for multi-carrier systems that possess a high number of degrees of freedom that can be exploited by a scheduler in order to improve spectral usage.

When it comes to practice, the optimization that relates to multi-user scheduling can be of high complexity and represents an important challenge. Low complexity solutions that pretend to be optimal have already been developed. For example, opportunistic schedulers that allocate one resource after the other based on a metric maximization have already been developed. In this example, a metric is associated to each user and reflects the usefulness of allocating resource to a user. The metric that has been defined, reflects the resource allocation in terms of Quality of Service Achievement (QoS), spectral efficiency for the system and fairness between users. QoS represents the performance observed by the user. Fairness reflects the ability of a scheduler to serve the different users of the system in similar proportions, that is to say not favoring certain users to the detriment of others.

Multi-antenna techniques have been developed with the development of Long-Term evolution (LTE) systems. These multi-antenna techniques have been introduced in order to enhance spectral efficiency. These techniques are particularly relevant in the case where signals of several users are put together and sent through multiple antennas in a linear or nonlinear fashion manner.

MIMO transmissions management imposes to the scheduler to take into account an additional dimension: the spatial dimension. A spatial precoding operation provides a spatial property to the transmission that can be for example by forming a beam that is directed in a particular direction. This extra spatial dimension enables to separate the signals at each receiver. For this purpose, the channel has to be well known at the transmitter thanks to feedback mechanism. These feedback mechanisms can be implicit or explicit channel state information feedback mechanisms in TDD (Time Division Duplex) or FDD (Frequency Division Duplex) modes.

The multi-user MIMO (MU-MIMO) is accomplished due to a precoder that can be optimized according to a given utility function. For example, an eigen beam forming approach can maximize the useful signal power to each user but does not take into account the residual interference between users. Beam forming is a signal processing technique used for directional signal transmission or reception. Another example is the block diagonal precoding that enables to cancel the interference between users but reduces the useful signal power. Multiple trade-off techniques exist; however approaching the optimal Signal to Interference plus-Noise Ratio (SINR) or capacity maximization usually requires a high complexity. Usually, the capacity of a network can be represented by maximum total rate that can be flowed by a heavily loaded cell. Due to matrix manipulations, close-to-optimal MIMO precoding determination involves an optimization step which is generally of high complexity.

It can be noticed that in MU-MIMO systems, a user pairing step is necessary in order to efficiently gather users whose channels are compatible. The channels need to be compatible in terms of useful signal and residual interference power according to a given precoding strategy. This pairing step is an opportunity to get good performance with sub-optimal precoding schemes, by creating MU-MIMO channels for which said precoder exhibits good performance. However, it increases the degrees of freedom in the system and by consequence the complexity of its optimization.

The use of multi-user scheduling and MU-MIMO techniques enables to meet the requirements of cellular networks efficiency regarding a near future deployment. Usually, in order to have the lowest complexity, the strategy is to pair users based on a long term approach. That is to say to compute the scheduler metric for each fixed pair of users and each resource, and performs an opportunistic scheduler. One drawback of this approach is that the user pairing is static, which involves that the opportunity to create adequate MU-MIMO channels in view of the used precoding technique is missed.

Another low complexity joint multi-user MIMO using block diagonalization precoding, pairing and scheduling method has been developed in the prior art. In this method, the strategy is to successively select the users to be paired according to the scheduler metric. Firstly, the user who has the maximal interference free capacity is selected as first user. Secondly, the user that has the best capacity under the interference from the fixed first user is selected as second user and so on. This solution has drawback. Indeed, the user selection process does not fully take into account the geometry of the channel. In this method, the first user capacity is indeed maximal, however the choice of the first user can drastically reduce the second user capacity and so on. Therefore, even if this type of method presents an advantage of low complexity, the selection of the users according to their capacity is far from being optimal. Indeed, it is of interest to reduce the computational complexity of the MIMO precoder and the number of the computations.

SUMMARY OF INVENTION

The present invention proposes to improve the situation.

The invention relates to a method of scheduling in a cellular system comprising a plurality of antenna means, the plurality of antenna means transmitting a plurality of spatial streams, wherein the plurality of spatial streams serve a plurality of users having respective capacities and the method comprises to that end:

calculating an approximated scheduling metric for each possible combination of:
  users among said plurality of users, and
  associated spatial streams among said plurality of spatial streams, the approximated scheduling metric being a function of user capacities without taking into account interference;
sorting the approximated scheduling metrics in descending order so as to obtain a classification of said possible combinations;

calculating a local scheduling metric for the first combination in said classification, the local scheduling metric being a function of real user capacities taking into account interference;

for each following combination in the classification:
comparing the approximated metric of the following combination to a preceding calculated local scheduling metric, and
if the approximated metric of the following combination is higher than the preceding calculated local scheduling metric, then the local scheduling metric of said following combination is calculated and, if the calculated local scheduling metric is higher than the preceding calculated local scheduling metric, then the calculated local scheduling metric replaces said preceding calculated local scheduling metric,
if the approximated metric of the following combination is lower than or equal to said preceding calculated local scheduling metric, defining the combination providing the preceding calculated local scheduling metric as the best combination of users and associated spatial streams.

With such method, the computational complexity is reduced and the approximated scheduling metric can be calculated outside a loop on the combination of users and associated spatial streams. Indeed, according to the above method, there is no need to calculate the local scheduling metric, which involves a higher computational complexity than the approximated metric computation, for all combinations. In the best case scenario, only one local scheduling metric for the first combination needs to be calculated.

In an embodiment, the method can further comprise the updating of an average rate of users according to said best combination. According to another embodiment, the method steps can be reiterated for each resource n out of N resource of the cellular system.

Therefore, a loop can be performed on the n out of N resource of the cellular system such that a resource allocation can be performed according to the above method.

In an embodiment the interference is due at least to several users using respective spatial streams having a same spatial direction.

In an embodiment, the calculating of the local scheduling metric includes a calculation of a precoder.

In an embodiment, the real user capacity is calculated from the precoder.

In an embodiment, a calculation of a simplified scheduling metric is performed before the calculation step of the approximated scheduling metric, the simplified scheduling metric depending on user approximated capacity and user average rate in a cell.

In an embodiment the simplified scheduling metric is determined based on the formula:

$$m_{simpl} = \frac{\hat{r}(n, k)}{R(k)^\alpha}$$

where:
$m_{simpl}$ is the simplified scheduling metric;
k is a user index;
n is a resource index;
$\hat{r}(n, k)$ is the approximated capacity of the k-th user for the resource n;
R(k) is the average rate of the user k in a cell;
α is a fairness criteria;

In an embodiment, the approximated scheduling metric is determined based on the formula:

$$m_{approx} = \sum_{t=1}^{T} \frac{\hat{r}(n, k_t(n))}{R(k_t(n))^\alpha}$$

where:
$m_{approx}$ is the approximated scheduling metric;
n is a resource index;
T is the number of spatial streams;
$k_t(n)$ is a user index transmitting on t-th spatial stream out of T of the resource n;
$\hat{r}(n, k_t(n))$ is the approximated capacity of the $k_t(n)$-th user transmitting on t-th spatial stream for the resource n;
$R(k_t(n))$ is the average rate of the $k_t(n)$-th user transmitting on t-th spatial stream for the resource n in a cell;
α is a fairness criteria.

The approximation of the scheduling metric is an upper bound of the capacity value. This provides an advantage to reduce the complexity of the calculation.

In an embodiment, the local scheduling metric is determined based on the formula:

$$m_{local} = \sum_{t=1}^{T} \frac{r(n, k_t(n))}{R(k_t(n))^\alpha}$$

where:
$m_{local}$ is the local scheduling metric;
n is a resource index;
T is the number of spatial streams;
$k_t(n)$ is a user index transmitting on t-th spatial stream out of T of the n resource;
$r(n, k_t(n))$ is the real capacity of the $k_t(n)$-th user transmitting on t-th spatial stream for the resource n;
$R(k_t(n))$ is the average rate of the $k_t(n)$-th user transmitting on t-th spatial stream for the resource n in a cell;
α is a fairness criteria.

Therefore, combining both the fairness effect and the interference-less metric discards users with an extra satisfaction, and prioritizes users in need of more allocation assuming they are not highly interfered.

In an embodiment, the cellular system is a 5G system.

Another Aspect of the invention relates to a computer program product, comprising instructions for performing the method as previously described, when run by a processor.

A third aspect relates to a scheduling device in a cellular system comprising a plurality of antenna means, the plurality of antenna means transmitting a plurality of spatial streams, wherein the plurality of spatial streams serve a plurality of users having respective capacities, comprising a circuit arranged for:
calculating an approximated scheduling metric for each possible combination of:
users among said plurality of users, and
associated spatial streams among said plurality of spatial streams, the approximated scheduling metric being a function of user capacities without taking into account interference;
sorting the approximated scheduling metrics in descending order so as to obtain a classification of said possible combinations;

calculating a local scheduling metric for the first combination in said classification, the local scheduling metric being a function of real user capacities taking into account interference;

for each following combination in the classification:
comparing the approximated metric of the following combination to a preceding calculated local scheduling metric, and if the approximated metric of the following combination is higher than the preceding calculated local scheduling metric, then the local scheduling metric of said following combination is calculated and, if the calculated local scheduling metric is higher than the preceding calculated local scheduling metric, then the calculated local scheduling metric replaces said preceding calculated local scheduling metric, if the approximated metric of the following combination is lower than or equal to said preceding calculated local scheduling metric, defining the combination providing the preceding calculated local scheduling metric as the best combination of users and associated spatial streams.

In an embodiment, said circuit is further arranged for:
updating an average rate of users according to said best combination.

The present invention is illustrated by way of example, and not by way of limitation, in the figures of the accompanying drawings, in which like reference numerals refer to similar elements.

DESCRIPTION OF EMBODIMENTS

The invention proposes to solve the joint user pairing, precoding and scheduling for the downlink of cellular network with a low complexity. Moreover, hardware architectures based on Central Processing Unit (CPU) and Graphical Processing Unit (GPU) are targeted by the present invention. These hardware architectures allows to consider methods that are more dynamics and which possess an execution time that is variable while the results of the optimization is necessarily given periodically. The precoding is an essential element as regards to performance achievement. However, the precoding requests a high amount of computational complexity. Numerous computational computations are required regarding the user pairing.

Figure 1:
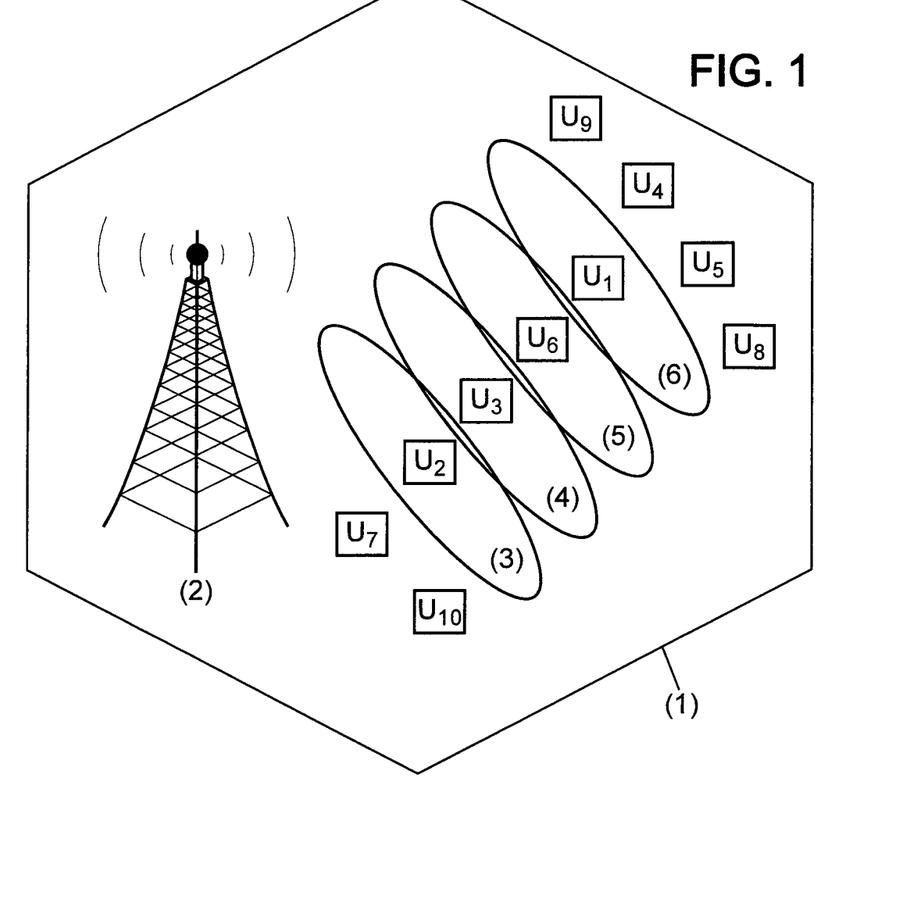
FIG. 1 is an example of a classic MU-MIMO system on which the present method can be applied.

FIG. 1 is an example of a classic MU-MIMO system on which the present method can be applied. The dimension cardinality of the precoding has to be taken into account. FIG. 1 represents a cell 1 with a base station 2 with four spatial streams 3, 4, 5 and 6. The cell 1 comprises ten users: $U_1$, $U_2$, ( . . . ) and $U_{10}$. A 100-Megahertz wide Orthogonal Frequency-Division Multiplexing (OFDM) system with 500 Physical Resource Blocks (PRB) requires 500 decisions of each 4-uple out of ten users to transmit on a PRB. Knowledge of the capacity of each user is necessary in order to take a scheduling decision. Having knowledge of the capacity of each user implies computation of the precoder and its associated performance. The brute approach requires in the linear case the computation of:

$$\frac{10!}{4!*6!} = 210 \text{ precoders}$$

Regarding non-linear precoding, that is to say without smartly ordering users, the number of precoders of size 4×4 goes up to 10^4. These two numbers of precoders concern deriving the allocation of one PRB, which involves the computation of 105000 precoders or 1 million precoders per frame that is to say 1 ms. Indeed, a PRB represents the smallest frequency resource unit that can be allocated to a user equipment (UE) by the scheduler.

A Base Band Unit (BBU) of a cellular network handling K users and being equipped with T spatial streams is considered. Each spatial stream can be connected to a larger set of physical antennas. The larger set of antennas can be for example a massive antenna array and an analog combination of many physical antennas to one power amplifier reducing the number of spatial streams to T. Therefore, the numerical design of the signal sees a MIMO channel with T inputs.

In order to provide a better understanding, it is considered that each UE is equipped with the same number R of receive antenna. This consideration is only for simplicity purpose, it does not reduce the scope of the present invention, indeed the present invention can be applied with heterogeneous number of receive antennas across UE. Each transmission frame is considered to comprise N resources that can be considered independently from each other.

Figure 2:
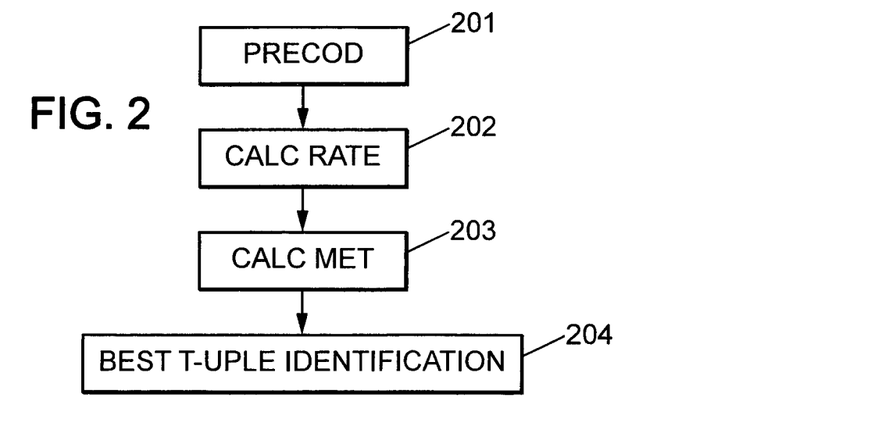
FIG. 2 is a flow chart illustrating the different steps of the brute force of scheduling and user equipment pairing.

FIG. 2 is a flow chart illustrating the different steps of the brute force of scheduling and user equipment pairing.

In step 201, an R×T MIMO channel matrix H(n,k) is observed between the BBU and the k-th UE on the n-resource. The coefficient of the matrix H(n,k) are weighted by the signal to noise ratio resulting in considering a noise with normalized power 1 in the following. The BBU receives the necessary information by means of Channel State Information (CSI) feedback mechanisms. $k_t(n)$ defines the user index in [1 K] transmitting on the t-th spatial stream out of T of the n-th resource out of N.

A T-uple $\{k_1(n), \ldots, k_T(n)\}$ represents a set of T UEs that is considered for a downlink transmission on the n-th resource.

The equivalent MIMO channel is not necessarily orthogonal. Each user intends to receive its message only. As a result, interference may occur between users. MIMO precoding techniques can be designed in order to optimize a transmission rate $r(n, k_t(n))$ received by each user. Several linear or nonlinear precoding techniques can be utilized. Each precoding technique has its advantage and drawback. Moreover, each precoding technique has manner to optimize the final SINR or capacity for each UE.

A set of rates $\{r(n,k_1(n)), \ldots, r(n,k_T(n))\}$ is a function of the precoder design. The set of rates $\{r(n,k_1(n)), \ldots, r(n,k_T(n))\}$ depends on the T-uple $\{k_1(n), \ldots, k_T(n)\}$. A Shannon capacity based metric is considered for evaluating the performance of the precoder. As a result, H(n,k)P(n) is the precoded MIMO channel as viewed by user k on resource n, P(n) representing the T×T precoding matrix. A symbol dedicated to the first user is sent on the first row of the matrix P, and so on. An OFDM symbol represents the signal in the time domain corresponding to a block of modulation symbols transmitted on the various subcarriers of the band of the system. Several symbols can be sent to the same user equipment, which involves that the index of this k-th user equipment can be found several times in the T-uple $\{k_1(n), \ldots, k_T(n)\}$.

In step 202, for a given precoder, the rate of k-th UE is calculated based on the following equation:

$$r(n,k) = \log_2(1 + E_k^\dagger P(n)^\dagger H(n,k)^\dagger W^{-1}(n,k) H(n,k) P(n) E_k)$$

Where:
† is the transpose conjugate operator;
Ek is a selection vector of size T with null entries but a 1 in position k;
W(n,k) is the covariance matrix of noise plus interference from the perspective of the k-th user;
Where W(n,k) is determined based on the following equations:

$$W(n,k) = I + H(n,k) P(n) (I - E_k E_k^\dagger) P(n)^\dagger H(n,k)^\dagger$$

A scheduler with an opportunistic implementation strategy is considered. The scheduler implements α-fairness between users. The average rate of the user k in the cell is represented by R(k). The scheduler intends to maximize the alpha-fair sum rate:

$$\Sigma_{k=1}^T f_\alpha(R(k))$$

Where:

$$f_\alpha(x) = \begin{cases} \dfrac{x^{1-\alpha}}{1-\alpha}, & \alpha \geq 0, \alpha \neq 1 \\ \log(x), & \alpha = 1 \end{cases}$$

For this purpose, the scheduler performs allocation decision. The strategy is to take each resource n and allocate the users maximizing a metric computed from a local knowledge R(k) of each user k's average rate and the instantaneous rates $r(n, k_t(n))$ obtained for the user transmitting on the t-th stream out of T, according to the precoder strategy and channel realization. The decision metric that optimizes $\Sigma_{k=1}^K f_\alpha(R(k))$ is to allocate the users T-uple $\{k_1(n), \ldots, k_T(n)\}$ that maximizes a local scheduling metric $m_{local}(n)$ to the n-th resource.

Therefore, in step 203 a local scheduling metric $m_{local}(n)$ is calculated, where the local metric $m_{local}(n)$ is calculated based on the following equation:

$$m_{local}(n) = \sum_{t=1}^{T} \frac{r(n, k_t(n))}{R(k_t(n))^\alpha}$$

A rate of r(n,k)=0 is given for the users k that are not selected in the set $\{k_1(n), \ldots, k_T(n)\}$. The rate of each user k is updated as $R(k) \leftarrow R(k) + r(n, k)$, or taking an average rate $R(k) \leftarrow R(k) + (r(n, k) - R(k))/n$, or $R(k) \leftarrow R(k) + \mu(n, k) - R(k))$, where μ is a predetermined forgetting factor.

Using a brute force approach for joint scheduling and UE pairing, the optimal way to maximize $\Sigma_{k=1}^K f_\alpha(R(k))$ by using an opportunistic scheduler is to perform a loop on the resource n, where 1≤n≤N, and a loop on each T-uple $\{k_1(n), \ldots, k_T(n)\}$, wherein:

Compute the precoder step 201
Compute the rates $\{r(n, k_1(n)), \ldots, r(n, k_T(n))\}$ step 202
Calculate the local scheduling metric $m_{local}$ (n) step 203
For each resource, the best T-uple $\{k_1(n), \ldots, k_T(n)\}$ that maximizes $m_{local}$ (n) is selected in step 204 and the rates R(k) are updated according to $\{r(n, k_1(n)), \ldots, r(n, k_T(n))\}$ and move to the next resource.

Figure 3:
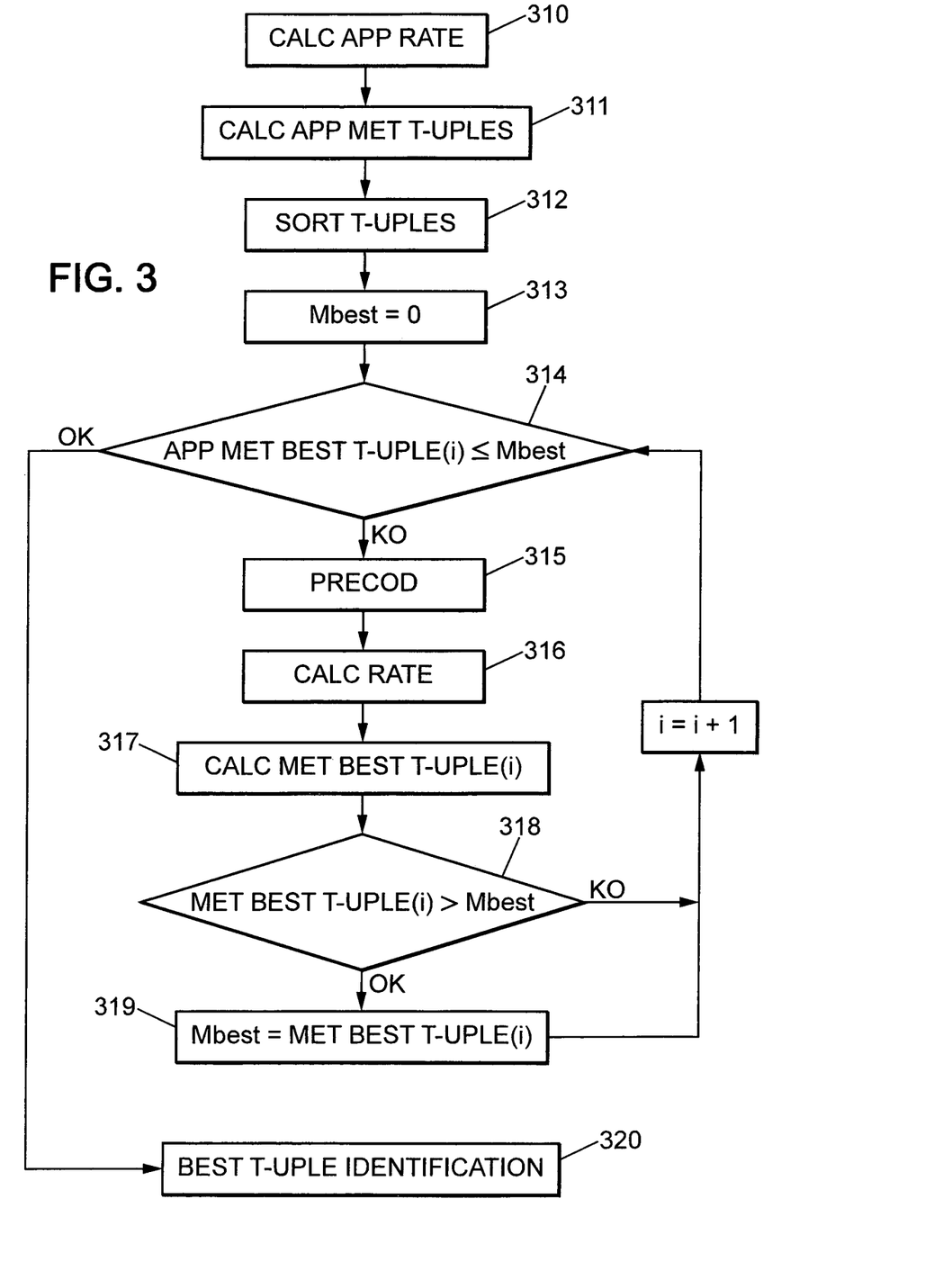
FIG. 3 is a flow chart describing the different steps in a possible embodiment of the present invention.

FIG. 3 is a flow chart describing the different steps in a possible embodiment of the present invention.

The first approach to reduce the complexity is to simplify the step 201 that relates to computing the precoder P(n) for each T-uple $\{k_1(n), \ldots, k_T(n)\}$. The precoder computation step 201 can be discarded. The rate $\{r(n, (n)), \ldots, r(n, k_T(n))\}$ calculation step 202 can be replaced by an approximated rate $\{\hat{r}(n, k_1(n)), \ldots, \hat{r}(n, k_T(n))\}$ calculation step 310 with a simpler computation. For instance, the interference can be neglected so the approximate rate is based on the following equation:

$$\hat{r}(n,k_t(n)) = \log_2(1 + H(n,k_t(n))^\dagger H(n,k_t(n)))$$

where the term related to the interference from other users in $r(n, k_t(n))$ is neglected.

The approximated rate calculation step 310 allows calculating an approximated scheduling metric $m_{approx}$ calculation in step 311 based on the following equation:

$$m_{approx} = \sum_{t=1}^{T} \frac{\hat{r}(n, k_t(n))}{R(k_t(n))^\alpha}$$

In step 310, the approximated rates are calculated for all users k, where 1≤k=K. Then $$\frac{\hat{r}(n, k)}{R(k)^\alpha}$$

is calculated and stored for all users. In step 311, the approximated metric $m_{approx}$ is calculated for all possible T-uples $\{k_1(n), \ldots, k_T(n)\}$. The Tuples $\{k_1(n), \ldots, k_T(n)\}$ are sorted in descending order according to their $m_{approx}$ in step 312. A variable named Mbest is set to 0 in step 313.

In step 314 starts a loop on the T-uples $\{k_1(n), \ldots, k_T(n)\}$ taken in the sorted order. If the approximated metric $m_{approx}$ of the first T-uple in the sorted order is lower than or equal to Mbest, the loop on the T-uples is over. If the approximated metric $m_{approx}$ of the first T-uple in the sorted order is higher than Mbest, the loop on the T-uples continues. The first T-uple in the sorted order can be designated as BEST TUPLE (i)=$\{k_1(n), \ldots, k_T(n)\}$ where i is an incrementation index. Therefore, when i is incremented (i=i+1), BEST TUPLE (i) designates the following T-uple in the sorted order.

The precoding computation is performed in step 315 and the rates $\{r(n, k_1(n)), \ldots r(n, k_T(n))\}$ are calculated from the precoder in step 316. Then the local scheduling metric $m_{local}$ is calculated for the BEST TUPLE (i) in step 317. In step 318 Mbest is compared to the local scheduling metric $m_{local}$ calculated for the BEST TUPLE (i) in the previous step. If the local scheduling metric $m_{local}$ calculated for the BEST TUPLE (i) in step 317 is higher than Mbest, then Mbest is updated by $m_{local}$ and BEST TUPLE (i) is stored as the best T-uple. After step 318 or step 319, the incrementation index is incremented and the loop on the T-uple carries on until Mbest is higher than current approximated metric for BEST TUPLE (i) in step 314 or until there is no more tuple to be tested among the set of all possible T-uples $\{k_1(n), \ldots,$ $\tilde{k}_T(n)\}$. Once the condition of step 314 is met, the best T-uple is identified in step 320. The rates R(k) are updated according to the best T-uple $\{\tilde{k}_1(n), \ldots, \tilde{k}_T(n)\}$ identified and their associated rates $\{r(n, \tilde{k}_1(n)), \ldots, r(n, \tilde{k}_T(n))\}$, which have provided Mbest. A rate of r(n,k)=0 is given for the users k that are not selected in the set $\{\tilde{k}_1(n), \ldots, \tilde{k}_T(n)\}$. The rate of each user k is updated as R(k)←R(k)+r(n, k), or taking an average rate R(k)←R(k)+(r(n, k)−R(k))/n, or R(k)←R(k)+μ(r(n, k)−R(k)), where μ is a predetermined forgetting factor.

The above steps from 310 to 320 are repeated for each resource n out of N of which constitutes a loop on n.

In order to further clarify, the numerical example is considered. Four users and two spatial streams are considered. The exhaustive list of Tuples, $m_{local}$ and $m_{approx}$ is listed in the table.

The approximated rates associated to users {1,2,3,4} are {10,20,30,40}, respectively. All users start with an average rate R(k)=1.

| T-uple | Rates | $m_{local}$ | $m_{approx}$ |
|---|---|---|---|
| $\{k_1(n), \ldots, k_T(n)\}$ | $\{r(n, k_1(n)), \ldots, r(n, k_T(n))\}$ | $\sum_{t=1}^{T} \frac{r(n, k_t(n))}{R(k_t(n))^\alpha}$ | $\sum_{t=1}^{T} \frac{\hat{r}(n, k_t(n))}{R(k_t(n))^\alpha}$ |
| {1, 2} | {7, 12} | 29 | 10 + 20 = 30 |
| {1, 3} | {8, 25} | 33 | 10 + 30 = 40 |
| {1, 4} | {0, 10} | 10 | 10 + 40 = 50 |
| {2, 3} | {19, 29} | 48 | 20 + 30 = 50 |
| {2, 4} | {2, 12} | 14 | 20 + 40 = 60 |
| {3, 4} | {3, 13} | 16 | 30 + 40 = 70 |

In the prior art method described in the introduction, first, the user with highest rate is selected that is to say the user 4 has 40. Then, the pairs involving 4 ({1,4}, {2,4} and {3,4}) are tested according to the precoding strategy and the best one is selected, that is to say {3,4}. Several tests have not been performed. Therefore, complexity is saved but the solution is not optimal since the best solution {2,3} has not been found.

The approximated rates of users {1,2,3,4} are first computed ({10,20,30,40}) independently with low complexity according to step 310. Then, in the last column of the table all the T-uples $m_{approx}$ are computed and sorted ({3,4}, {2,4},{2,3},{1,4},{1,3},{1,2}) according to step 311 and 312 respectively.

Mbest is set to 0 according to step 313. The t-uple {3,4} $m_{approx}$ is 70. As it is larger than 0 (step 314), the precoder is computed in step 315 and $m_{local}$ $m_{local}$ 16 is obtained in step 317. As 16 is higher than 0, 16 is stored as Mbest in step 319. The loop on T-uples carries on.

The T-uple {2,4} is the following in the sorted order and $m_{approx}$ is 60 which is larger than 16. The precoder is computed and metric 14 is obtained, it is lower than 16 and not stored as Mbest.

The tuple {2,3} $m_{approx}$ is 50 which is larger than 16. The precoder is computed and metric 48 is obtained and stored as Mbest.

The tuple {1,4} $m_{approx}$ is 50 which is larger than 48. The precoder is computed and metric 10 is obtained, it is lower than 48 and not stored as Mbest.

The tuple {1,3} $m_{approx}$ is 40 which is lower than 48. Therefore, according to step 314 the loop on T-uple stops and scheduling 320 can be performed. It can be noticed that two precoder computations have been saved and the best solution {2,3} has been found.

Figure 4:
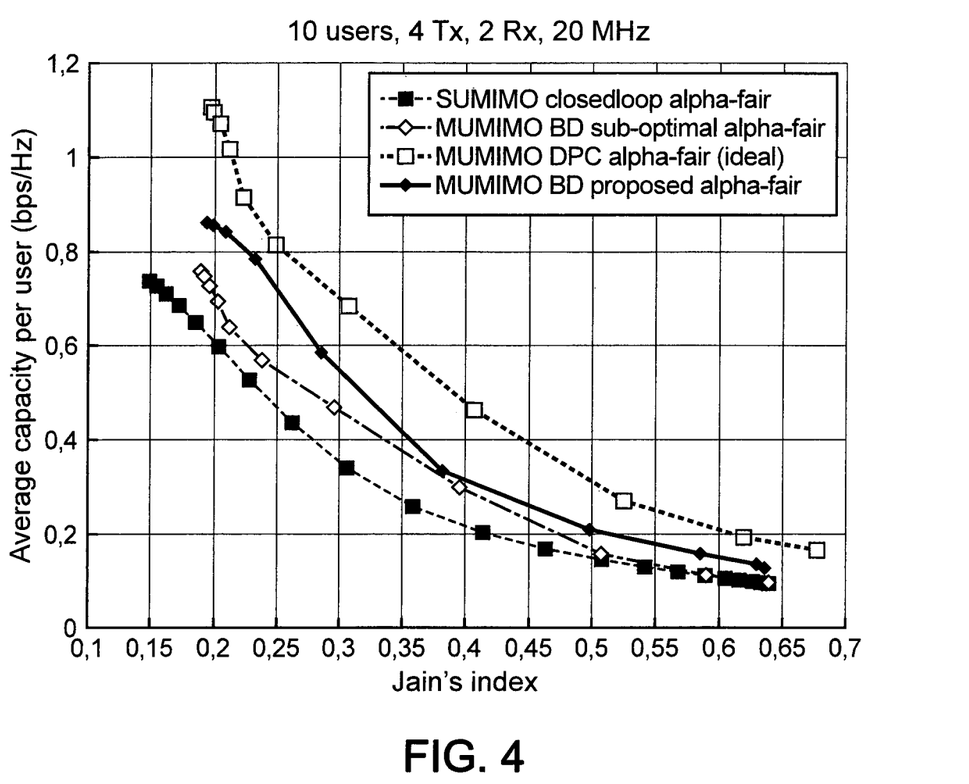
FIG. 4 represents performance of this method where the average cell capacity is plotted with the Jain's fairness.

FIG. 4 represents performance of this method where the average cell rate is plotted with the Jain's fairness for a LTE deployment with ten users per cell and four streams. A block-diagonal precoder is considered. The proposed method performs better than prior art which is better than the single user MIMO alpha-fair scheduling. The dirty paper coding theoretical upper bound is not met, but can be approached by replacing the linear BD precoder by a non-linear precoder, for example using Tomlinson Harashima Precoding.

Figure 5:
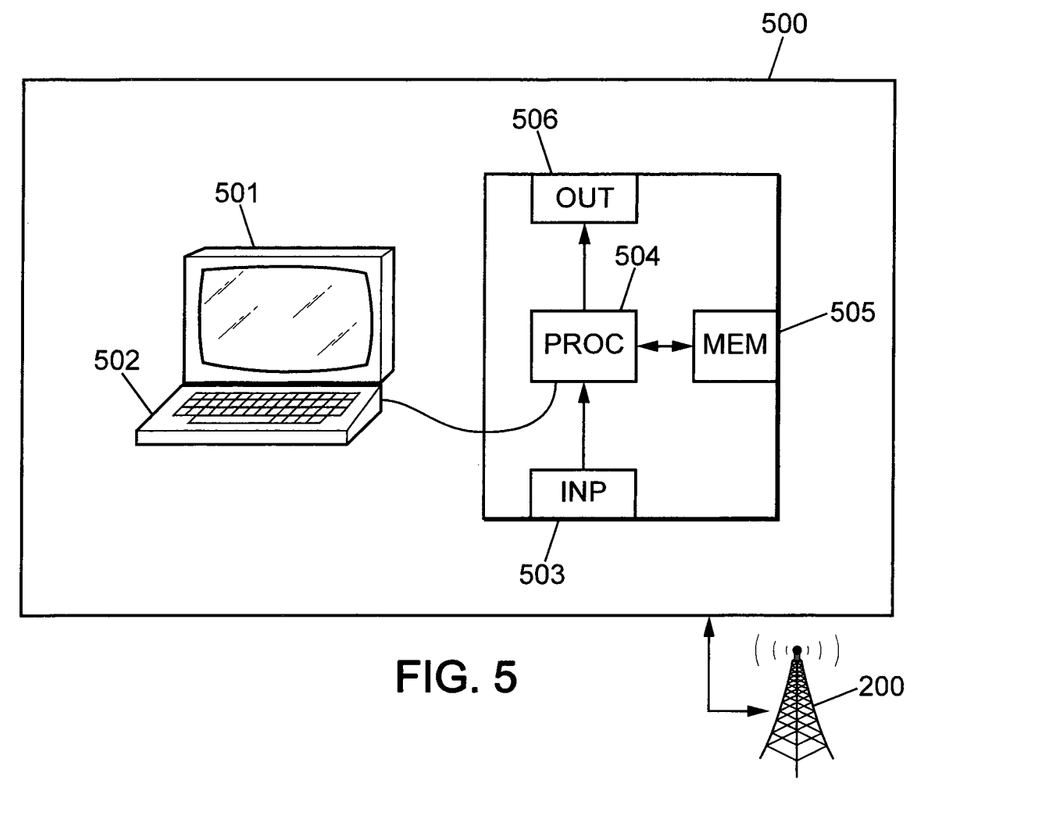
FIG. 5 is a possible embodiment for a device that enables the present invention.

FIG. 5 is a possible embodiment for a device that enables the present invention.

In this embodiment, the device 500 comprises a computer, this computer comprising a memory 505 to store program instructions loadable into a circuit and adapted to cause circuit 504 to carry out the steps of the present invention when the program instructions are run by the circuit 504.

The memory 505 may also store data and useful information for carrying the steps of the present invention as described above.

The circuit 504 may be for instance:

- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for «Field-Programmable Gate Array»).

This computer comprises an input interface 503 for the reception of measurements used for the above method according to the invention and an output interface 506.

To ease the interaction with the computer, a screen 501 and a keyboard 502 may be provided and connected to the computer circuit 504.

The device 500 can be part of the base station 200.

The present method can be used for many applications. For example the method can be implemented on a computational architecture that share its power between different process, which is the case in computers or GPU, and which will be the case in Software Defined Networks and cloud RAN. It is of interest to exploit the variability of the computational time of the method. Indeed, according to the channel realizations, the stop condition will occur earlier or later than the average. When using a fixed architecture such as a field programmable gate array, the hardware must be dimensioned for the worst case or the performance penalty be evaluated.

In the implementation of the method, the computation budget for N PRBs can be taken by the few first PRB allocation, which may result in empty decisions for the majority of PRBs and reduce the spectral efficiency. Thus, it is of interest to guarantee that at least one decision is taken per PRB, and in a second priority that this decision is the best as possible. In order to achieve this goal, the operations scheduling of the method can be modified by first performing the approximation computation and sort of approximated metrics for all the PRBs. Then, a loop on the index of the T-uples can be performed in the sorted list. Afterward, a loop on the physical resource blocks can be performed. If the method has not stopped yet, the performance of the T-uple associated to the index for the considered physical resource block is checked.

Of course, the present invention is not limited to the embodiments described above as examples. It extends to other variants. For example orthogonality metric can be used instead of cumulative distance for pre-sorting. The present invention expands to MIMO transmission instead of single stream transmissions. Various types of precoders can be used such as: Eigen beam forming, Block diagonal precoder with Eigen beam forming, nonlinear precoding THP and nonlinear precoding with block triangulation.

The invention claimed is:

1. A method of scheduling in a cellular system comprising a plurality of antenna devices, the plurality of antenna devices transmitting a plurality of spatial streams, wherein the plurality of spatial streams serve a plurality of users having respective capacities and the method comprising:
   calculating an approximated scheduling metric for each possible combination of:
      users among said plurality of users, and
      associated spatial streams among said plurality of spatial streams,
   the approximated scheduling metric being a function of user capacities without taking into account interference;
   sorting the approximated scheduling metrics in descending order so as to obtain a classification of said possible combinations;
   calculating a local scheduling metric for the first combination in said classification, the local scheduling metric being a function of real user capacities taking into account interference;
   for each following combination in the classification:
      comparing the approximated metric of the following combination to a preceding calculated local scheduling metric, and
      if the approximated metric of the following combination is higher than the preceding calculated local scheduling metric, then the local scheduling metric of said following combination is calculated and, if the calculated local scheduling metric is higher than the preceding calculated local scheduling metric, then the calculated local scheduling metric replaces said preceding calculated local scheduling metric,
      if the approximated metric of the following combination is lower than or equal to said preceding calculated local scheduling metric, defining the combination providing the preceding calculated local scheduling metric as the best combination of users and associated spatial streams.

2. The method according to claim 1, comprising further:
updating an average rate of users according to said best combination.

3. The method according to claim 1, wherein the method processes are reiterated for each resource n out of N resource of the cellular system.

4. The method according to claim 1, wherein said interference is due at least to several users using respective spatial streams having a same spatial direction.

5. The method according to claim 1, wherein the calculating of the local scheduling metric includes a calculation of a precoder.

6. The method according to claim 5, wherein the real user capacity is calculated from the precoder.

7. The method according to claim 1, wherein a calculation of a simplified scheduling metric is performed before the calculation process of the approximated scheduling metric, the simplified scheduling metric depending on user approximated capacity and user average rate in a cell.

8. The method according to claim 6, wherein the simplified scheduling metric is determined based on the formula:

$$m_{simpl} = \frac{\hat{r}(n, k)}{R(k)^\alpha}$$

where:
$m_{simpl}$ is the simplified scheduling metric;
k is a user index;
n is a resource index;
$\hat{r}(n, k)$ is the approximated capacity of the k-th user for the resource n;
R(k) is the average rate of the user k in a cell;
$\alpha$ is a fairness criteria.

9. The method according to claim 1, wherein the approximated scheduling metric is determined based on the formula:

$$m_{approx} = \sum_{t=1}^{T} \frac{\hat{r}(n, k_t(n))}{R(k_t(n))^\alpha}$$

where:
$m_{approx}$ is the approximated scheduling metric;
n is a resource index;
T is the number of spatial streams;
$k_t(n)$ is a user index transmitting on t-th spatial stream out of T of the resource n;
$\hat{r}(n, k_t(n))$ is the approximated capacity of the $k_t(n)$-th user transmitting on t-th spatial stream for the resource n;
$R(k_t(n))$ is the average rate of the $k_t(n)$-th user transmitting on t-th spatial stream for the resource n in a cell;
$\alpha$ is a fairness criteria.

10. The method according to claim 1, wherein the local scheduling metric is determined based on the formula:

$$m_{local} = \sum_{t=1}^{T} \frac{r(n, k_t(n))}{R(k_t(n))^\alpha}$$

where:
$m_{local}$ is the local scheduling metric;
n is a resource index;
T is the number of spatial streams;
$k_t(n)$ is a user index transmitting on t-th spatial stream out of T of the n resource;
$r(n, k_t(n))$ is the real capacity of the $k_t(n)$-th user transmitting on t-th spatial stream for the resource n;
$R(k_t(n))$ is the average rate of the $k_t(n)$-th user transmitting on t-th spatial stream for the resource n in a cell;
$\alpha$ is a fairness criteria.

11. The method according to claim 1, wherein the cellular system is a 5G system.

12. A non-transitory computer readable storage medium, storing instructions for performing the method as claimed in claim 1, when run by a processor.

13. A scheduling device in a cellular system comprising a plurality of antenna devices, the plurality of antenna devices transmitting a plurality of spatial streams, wherein the plurality of spatial streams serve a plurality of users having respective capacities, comprising a processing circuit:
  to calculate an approximated scheduling metric for each possible combination of:
    users among said plurality of users, and
    associated spatial streams among said plurality of spatial streams,
    the approximated scheduling metric being a function of user capacities without taking into account interference;
  to sort the approximated scheduling metrics in descending order so as to obtain a classification of said possible combinations;
  to calculate a local scheduling metric for the first combination in said classification, the local scheduling metric being a function of real user capacities taking into account interference;
  for each following combination in the classification:
    to compare the approximated metric of the following combination to a preceding calculated local scheduling metric, and
    if the approximated metric of the following combination is higher than the preceding calculated local scheduling metric, then the local scheduling metric of said following combination is calculated, if the calculated local scheduling metric is higher than the preceding calculated local scheduling metric, and then the calculated local scheduling metric replaces said preceding calculated local scheduling metric,
    if the approximated metric of the following combination is lower than or equal to said preceding calculated local scheduling metric, defining the combination providing the preceding calculated local scheduling metric as the best combination of users and associated spatial streams.

14. The scheduling device according to claim 13, wherein said processing circuit is further arranged
  to update an average rate of users according to said best combination.

15. A non-transitory computer readable storage medium, storing instructions for performing the method as claimed in claim 2, when run by a processor.

16. A non-transitory computer readable storage medium, storing instructions for performing the method as claimed in claim 3, when run by a processor.

17. A non-transitory computer readable storage medium, storing instructions for performing the method as claimed in claim 4, when run by a processor.

18. A non-transitory computer readable storage medium, storing instructions for performing the method as claimed in claim 5, when run by a processor.

19. A non-transitory computer readable storage medium, storing instructions for performing the method as claimed in claim 6, when run by a processor.

20. A non-transitory computer readable storage medium, storing instructions for performing the method as claimed in claim 7, when run by a processor.

* * * * *